United States Patent [19]
Valenzuela, Jr.

[11] 3,785,165
[45] Jan. 15, 1974

[54] AIR CONDITIONER CONTROL

[76] Inventor: Ephren Valenzuela, Jr., 1119 2nd Ave., Chula Vista, Calif. 92011

[22] Filed: Mar. 15, 1972

[21] Appl. No.: 234,825

[52] U.S. Cl. ............... 62/158, 62/261, 62/262, 62/231
[51] Int. Cl. ............................. G05d 23/32
[58] Field of Search ............ 62/157, 158, 261, 62/262

[56] References Cited
UNITED STATES PATENTS
| | | | |
|---|---|---|---|
| 3,054,271 | 9/1962 | McGrath | 62/158 |
| 3,101,432 | 8/1963 | Adams | 62/158 |
| 3,142,013 | 7/1964 | McGrath | 62/158 |
| 3,128,607 | 4/1964 | Kyle | 62/158 |
| 3,583,173 | 6/1971 | Cheseboro | 62/158 |
| 3,695,054 | 10/1972 | Barry | 62/158 |

*Primary Examiner*—William J. Wye
*Attorney*—Max Dressler et al.

[57] ABSTRACT

A thermostatic air conditioner control for use with individual unit air conditioners having a thermostatic switch disposed at a location remote from the air conditioner. The control includes circuitry interposed between the air conditioner and a source of electrical energy operative a selected time interval after closure of said thermostatic switch to energize a socket in which the air conditioner is plugged, and operative a selected time interval after opening of said thermostatic switch to de-energize the socket.

9 Claims, 2 Drawing Figures

AIR CONDITIONER CONTROL

BACKGROUND

Many individual unit air conditioners such as room air conditioners do not have temperature responsive controls for monitoring the operation thereof. Those air conditioners which do have controls are often located in positions within the room which makes it inconvenient to operate such controls or which renders such controls inaccessible.

Even when such air conditioners have the desired controls and when those controls are accessible, the controls of such air conditioners are responsive to the temperature adjacent to the air conditioner rather than the temperature at desired locations in the room in which the air conditioner is disposed.

One of the problems in the use of room or individual unit air conditioners is to control the operations of such units to provide desired temperatures at desired locations in the room or area being cooled.

Another problem in the operation of room air conditioners is the tendency to turn the air conditioner on immediately after being turned off. This type of manipulation should be avoided in order to insure proper operation of the air conditioner compressor.

In most circumstances, an overload relay is installed in the compressor circuit, the compressor being a pump having high gas pressures. When the compressor is started properly, gas pressures are equal on both sides of the compressor. Once the compressor is started, gas pressures on one side are substantially greater than on the other side. To start a compressor under proper circumstances requires a large surge of current. Once at operating conditions, the normal current draw is experienced.

When an air conditioner is turned on and off rapidly, the compressor is not starting with equal gas pressures, but rather it is pumping against higher than normal pressures. When this occurs, excessive current draw is experienced during starting and the overload relay protecting the compressor is operative to prevent damage to the air conditioner or to the electrical circuitry to which the air conditioner is connected. This overload cycling can be prevented by waiting for a few minutes between compressor starts to allow gas pressure to equalize.

Unfortunately, most people do not understand this operational limitation and do not follow this simple precaution. As a result, it often occurs that the breaker or fuse in the circuit to which the air conditioner is connected blows since higher fuse ratings that would accommodate these excess current surges are not permitted in ordinary wiring circuits.

Therefore, it would also be desirable not only to operate an air conditioner in response to temperature levels at locations remote from the installation thereof but to insure that overload problems which result from improper starting of the air conditioner compressor are avoided.

BRIEF DESCRIPTION OF THE INVENTION

In accordance with the present invention there is provided an air conditioner control which is operative in response to selected temperatures in a room in which an air conditioner is installed at locations remote from the air conditioner, and which concurrently provides the desired protection to prevent the air conditioner from being improperly started.

In accordance with the present invention, a self contained control circuit is electrically interposed between the air conditioner and the source of electrical energy and includes a remotely situated thermostatic switch disposed at the location where it is desired to obtain selected temperature levels.

The control circuit of the present invention is simple, compact and provides the desired control and safety functions while being adapted for use with any standard individual air conditioning units such as a window room air conditioners.

In accordance with the present invention, the air conditioner is plugged into the control unit which is plugged into the normal wall outlet. The control unit includes electrical circuitry interposed between the socket into which the air conditioner is plugged and the wall outlet for selectively controlling energization of the socket and, thereby, the air conditioner. This control circuitry is a low voltage circuitry which provides full potential to the socket into which the air conditioner is plugged.

Incorporated as part of the control is a remotely located thermostat which is affixed at a location at which it is desired to monitor the ambient room temperature. The thermostat, as is well known, operates to close a thermostatic switch when the temperature in the room at the thermostat location increases to a selected level.

Upon closure of the thermostatic switch, a time delay relay connected in series therewith and across the secondary of a step down transformer is energized. A time delay control switch is connected in series with a control relay across the secondary of the step down transformer. The time delay relay is operative at a selected time interval after closure of the thermostatic switch to close its associated contacts and energize control relay. The control relay closes its normally open contacts connected in series with the socket to connect the socket to the wall outlet and energize the socket whereby the air conditioner plugged into the socket is operated.

Numerous other advantages and features of the present invention will become readily apparent from the following detailed description of the invention and of one embodiment thereof, from the claims and from the accompanying drawings in which each and every detail shown is fully and completely disclosed as a part of this specification in which like numerals refer to like parts.

Figure 1:
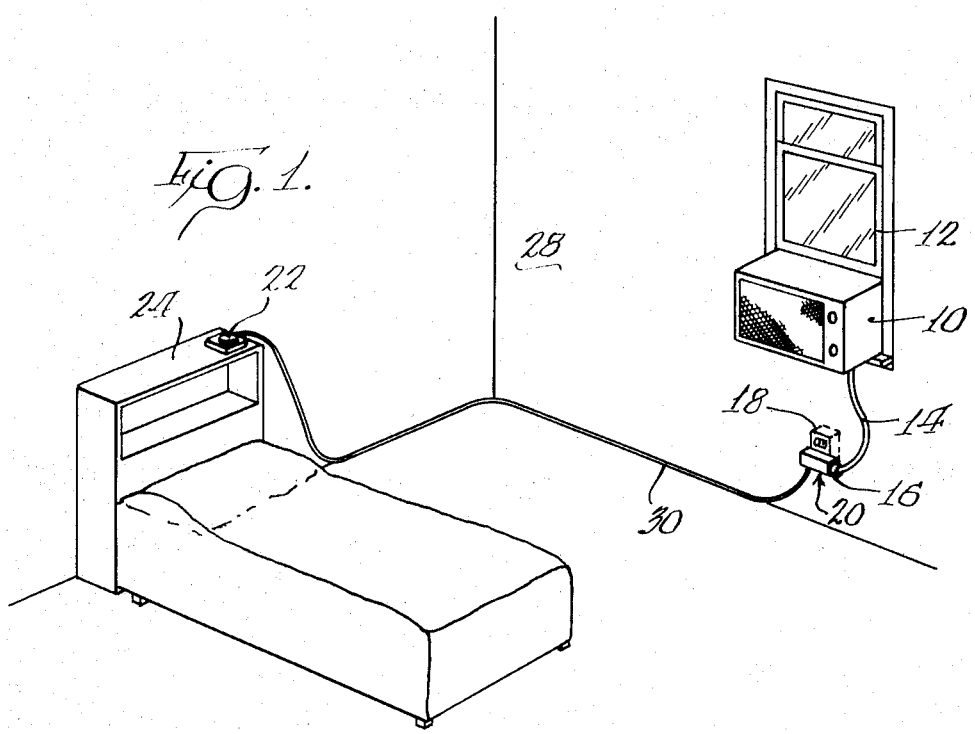
FIG. 1 is a diagramatic view showing an air conditioner connected to the control circuit of the present invention and one location of the remotely located thermostat.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

In FIG. 1 there is shown a room air conditioner 10 disposed, as is well known, in window 12. The room air conditioner 10 is provided with a cord 14, on the end of which is disposed a plug 16 adapted for insertion into an electrical wall outlet 18. The air conditioner plug 16, as seen in FIG. 1, is inserted into the self contained control 20 of the present invention which in turn is plugged into the wall outlet 18. A thermostat 22, forming part of the control of the present invention, is disposed at a location remote therefrom, such as at 24 as shown in FIG. 1 adjacent to a bed disposed in the room 28 at a location remote from the air conditioner 10 itself. The thermostat is connected to the self contained control 20 by an appropriate card 30.

Figure 2:
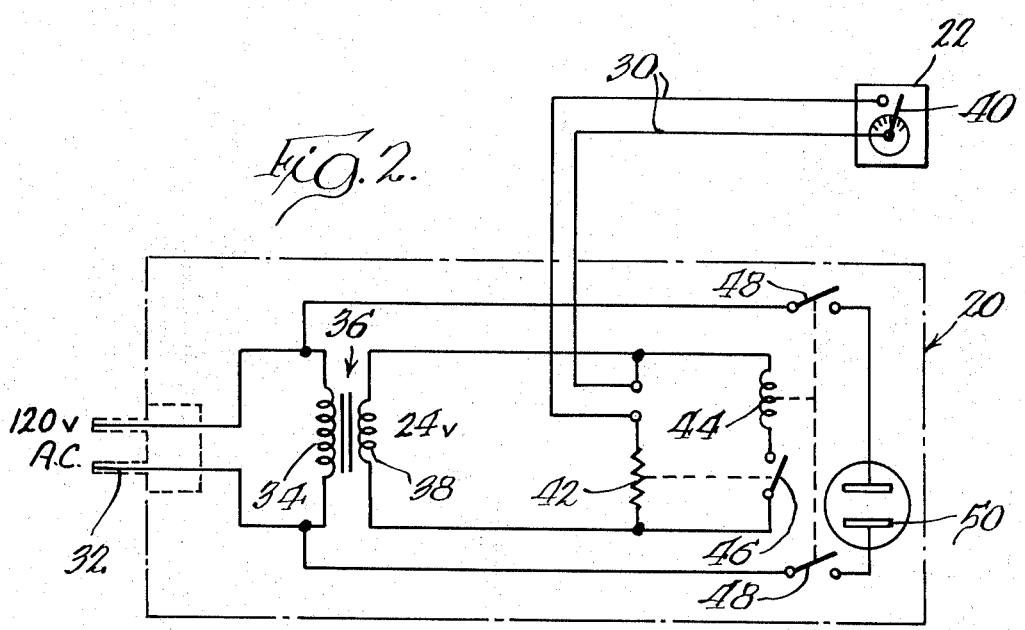
FIG. 2 is a schematic electrical diagram of the control circuit of the present invention.

FIG. 2 shows shows schematically the electrical circuit incorporated as part of the present invention. Within the control unit 20 there is an appropriate plug 32 adapted for insertion into the wall outlet 18. The plug 32 is connected across the primary 34 of a step down transformer 36, the secondary 38 of which provides a voltage of about 24 volts.

The thermostat 22 incorporates a thermostatic switch 40 responsive to the ambient temperature at the thermostat location 24. The switch 40 closes when the ambient temperature sensed by the thermostat 22 reaches a selected level selectable by the thermostat, and opens when the ambient temperature falls below the selected temperature.

The thermostatic switch 40 is connected in series with a time delay relay 42, this series combination being connected across the secondary 38 of a step down transformer 36. A control relay coil 44 and the normally open contacts 46 of the time delay relay 42 are connected in series with each other and are also connected across the secondary 38 of the step down transformer 36. The normally open contacts 48 of the control relay 44 are connected in series with the socket 50 which series combination is connected across the primary 34 of the step down transformer 36, i.e., to the wall outlet 18.

In operation, when the temperature in the room 28 rises to the value selected on the thermostat 22, the thermostatic switch 40 closes to complete the circuit across the secondary 38 of the step down transformer 36 through the time delay relay 42. The energized time delay relay 42 is operative after a selected time interval, which may be from several seconds to several minutes, to close its associated normally open contacts 46 connected in series with the control relay coil 44 across the secondary of the step down transformer.

When the control relay coil 44 is thus energized, it closes its normally open contacts 48 connected in series with the socket 50 thereby connecting the socket across the primary 34 of the step down transformer 36 to energize the socket and the air conditioner 10 plugged into the socket 50.

It can be appreciated that the time delay relay utilized in the control of the present invention can be selected to operate at any desired delay interval, the interval selected typically being governed by the minimum waiting period required for turning the air conditioner on after it has once turned off. Thus, not only does the present invention automatically control the operation of the air conditioner as a function of sensed ambient room temperature, but provides the necessary protection against improper operation of the air conditioner by precluding improper restarts of the compressor.

In one illustrative embodiment the thermostat utilized was an ITT General Controls room thermostat, Catalogue No. T99JV300J, Model H; the time delay relay utilized was a General Electric MARS relay No. 276; the control relay was an RBM relay, Catalogue No. 90-230; and the step down transformer was a Honeywell transformer No. AT870A-1106.

It can be appreciated that the above identified components are merely exemplary of components which might be utilized and other suitable components may be substituted.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A thermostatic air conditioner control adapted for use with individual unit air conditioners comprising in combination:
   means for connecting said control to a source of electrical energy;
   socket means adapted to receive the leads of said air conditioner unit;
   switching circuit means adapted to selectively interconnect said source connecting means and said socket means to energize said socket means and, thereby, said air conditioner unit;
   said switching circuit means including first temperature sensitive switching means responsive to surrounding ambient temperatures and actuated in response to a selected ambient temperature;
   timing means energized in response to the operation of said temperature sensitive switching means and operative a selected time interval after energization thereof;
   relay means connected to be energized in response to operation of said timing means;
   relay switch means operative in response to energization of said relay means for interconnecting said source connecting means and said socket means to energize said socket means.

2. A control as claimed in claim 1 wherein said source connecting means is a plug adapted to be inserted into an A.C. wall outlet connected to a source of A.C. voltage.

3. A control as claimed in claim 2 wherein said plug is connected to the primary of a step down transformer, and wherein said socket and said relay switch means are connected in series with each other across the primary of said step down transformer.

4. A control as claimed in claim 3 wherein said temperature responsive switching means and said timing means are connected in series with each other and across the secondary of said step down transformer.

5. A control as claimed in claim 4 including control switch means connected in series with said relay means across the secondary of said step down transformer, said control switch means closing in response to operation of said timing means to energize said relay means.

6. A control as claimed in claim 5 wherein said temperature sensitive switching means is located remotely from the remainder of said control, whereby said control is adapted to be operative in response to selected ambient temperature at a location remote therefrom and remote from the air conditioner unit connected to said socket means.

7. A control as claimed in claim 6 wherein said temperature responsive switching means is a thermostat and includes means for selecting the ambient temperature at which said temperature responsive switching means closes.

8. A control as claimed in claim 7 wherein said timing means includes a time delay relay connected in series with said temperature responsive switching means, said time delay relay being operative a selectable time interval after closure of said temperature responsive switching means to close said control switch means, and being operative a selected time interval after opening of said temperature sensitive switch means to open the contacts of said control switch means.

9. A thermostatic air conditioner control for controlling the operation of a room air conditioner in response to variations in the temperature of the room at a point remote from said air conditioner comprising in combination:

a thermostatic switch disposed at a location remote from said air conditioner for sensing ambient temperatures at said location, said thermostatic switch including means for selecting a desired temperature and switching means closing in response to said sensed ambient temperature being above said selected temperature and opening in response to said sensed ambient temperature being below said selected temperature;

circuit means electrically connecting said switching means in series with a time delay relay, said series combination of said switching means and said time delay relay being connected across the secondary of a step down transformer; means connecting the primary of said step down transformer to a source of electrical energy;

a relay coil, and time delay switch contacts operatively associated with said time delay relay, said time delay relay contacts and said relay coil being connected in series with each other across said secondary of said step down transformer, said time delay relay operative a selected time interval after closing of said thermostatic switch to close said time delay contacts and energize said relay coil; normally open relay contacts closing in response to the energization of said relay coil, said relay contacts being connected in series with a socket across the primary of said step down transformer; whereby said socket is connected to said source of electrical energy a selected time interval after closure of said thermostatic switch and is disconnected from said source of electrical energy a selected time interval after opening of said thermostatic switch to energize and deenergize a room air conditioner connected to said socket.

* * * * *